(12) United States Patent
Von Der Hardt et al.

(10) Patent No.: US 7,198,053 B2
(45) Date of Patent: Apr. 3, 2007

(54) CLEANING METHOD FOR FILTER TESTING DEVICE, COMPUTER PROGRAM PRODUCT FOR IMPLEMENTING SAID METHOD AND FILTER TESTING DEVICE

(75) Inventors: Jochen Von Der Hardt, Goettingen (DE); Juergen Van Den Boogaard, Coram, NY (US); Reinhard Baumfalk, Goettingen (DE); Oscar-Werner Reif, Hannover (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 10/762,553

(22) Filed: Jan. 23, 2004

(65) Prior Publication Data

US 2004/0211445 A1 Oct. 28, 2004

Related U.S. Application Data

(63) Continuation of application No. PCT/EP02/03037, filed on Mar. 19, 2002.

(30) Foreign Application Priority Data

Jul. 23, 2001 (DE) ................................ 101 35 785

(51) Int. Cl.
*B08B 3/00* (2006.01)
(52) U.S. Cl. ................................ 134/56 R; 134/166 R
(58) Field of Classification Search ..... 134/166 R–166 C, 56 R
See application file for complete search history.

(56) References Cited

U.S. PATENT DOCUMENTS

| 4,701,861 A | 10/1987 | Kauke |
| 4,881,176 A | 11/1989 | Kononov |
| 5,714,379 A * | 2/1998 | Phipps, Jr. .................. 435/266 |

FOREIGN PATENT DOCUMENTS

| DE | 21 06 223 B2 | 2/1971 |
| DE | 36 28 656 A1 | 8/1986 |
| DE | 196 05 211 C1 | 2/1996 |

* cited by examiner

*Primary Examiner*—Joseph L. Perrin
(74) *Attorney, Agent, or Firm*—Crowell & Moring LLP

(57) ABSTRACT

A cleaning method for a filter testing device (10) including switching devices (V1–V6), external connections (12, 14, 16, 18, 20) and internal volumes (24, 26, 28, 30, $V_{V1}$–$V_{V5}$) that can come into contact with a fluid from a filter device that is to be tested. The cleaning method involves the steps of: selecting one or more internal volumes (24, 26, 28, 30, $V_{V1}$–$V_{V5}$) to be cleaned, cleaning the selected internal volumes (24, 26, 28, 30, $V_{V1}$–$V_{V5}$) with a cleaning fluid by correspondingly switching the switching devices (V1–V6), and removing the cleaning fluid contained in the internal volumes (24, 26, 28, 30, $V_{V1}$–$V_{V5}$) from the internal volumes. Also a computer program product with program parts for implementing the method of the invention or a preferred embodiment thereof, and a filter testing device adapted to be cleaned by the method of the invention.

8 Claims, 2 Drawing Sheets

FIG. 2

| State | Command | V1 | V2 | V3 | V4 | V5 | V6 |
|---|---|---|---|---|---|---|---|
| Z1 | Filling internal reference tank | closed | open | open | closed | closed | closed |
| Z2 | Filling external venting | closed | closed | open | open | open | closed |
| Z3 | Filling filter connection | closed | closed | open | open | closed | closed |
| Z4 | Closing valves | closed | closed | closed | closed | closed | closed |
| Z5 | Rinsing | closed | open | open | open | open | closed |
| Z6 | Drying reference tank | closed | open | open | closed | open | closed |
| Z7 | Closing reference tank | closed | closed | open | closed | open | closed |
| Z8 | Press buildup V6 | closed | closed | open | closed | open | X% |
| Z9 | Drying internal venting | open | closed | open | closed | open | X% |
| Z10 | Overlapping | open | closed | open | open | open | X% |
| Z11 | Drying external venting | open | closed | closed | open | open | X% |
| Z12 | Overlapping | open | closed | open | open | open | X% |
| Z13 | Drying internal venting | open | closed | open | closed | open | X% |
| Z14 | Venting | closed | closed | open | closed | open | closed |
| Z15 | Pressure buildup V6 | closed | closed | closed | closed | open | X% |
| Z16 | Drying external venting | open | closed | closed | open | open | X% |
| Z17 | Drying filter connection | open | closed | closed | open | closed | X% |
| Z18 | Closing V6 | closed | open | open | closed | open | closed |

US 7,198,053 B2

CLEANING METHOD FOR FILTER TESTING DEVICE, COMPUTER PROGRAM PRODUCT FOR IMPLEMENTING SAID METHOD AND FILTER TESTING DEVICE

CROSS REFERENCE TO RELATED APPLICATIONS

This application is a continuation of international patent application no. PCT/EP02/03037, filed Mar. 19, 2002 designating the United States of America and published in German as WO 03/011428, the entire disclosure of which is incorporated herein by reference. Priority is claimed based on Federal Republic of Germany patent application no. DE 101 35 785.0, filed Jul. 23, 2001.

BACKGROUND OF THE INVENTION

The present description relates to a cleaning method for a filter testing device, a computer program product for implementing the inventive method, and a filter testing device for testing filters.

There are known filter testing devices for testing filters or filter systems which include valves and external connections. The valves are connected to one another and to the external connections by connecting lines. In testing a filter or a filter system, the filter testing device is traditionally connected to the input side, i.e., the side to which the unfiltered fluid is supplied. Thus, the filter testing device may become contaminated with bacteria or chemicals, for example, due to the unfiltered fluid being returned back to the filter testing device.

SUMMARY OF THE INVENTION

Accordingly, it is an object of the invention to provide a method for cleaning a filter testing device.

Another object of the invention is to provide a computer program product for implementing a method of cleaning a filter testing device.

A further object of the invention is to provide a filter testing device which is adapted to be cleaned by the method of the invention.

These and other objects are achieved in accordance with the present invention by providing a method for cleaning a filter testing device comprising switching means, external connections and internal volumes which can come in contact with a fluid from a filter that is to be tested, the method comprising the steps of selecting at least one internal volume to be cleaned; cleaning the selected internal volume(s) by switching the switching means to contact the selected internal volume(s) with a cleaning fluid; and discharging the cleaning fluid from the selected internal volume(s).

In accordance with a further aspect of the invention, the objects are achieved by providing a computer program product comprising program parts for implementing the method of the invention.

In yet another aspect, the objects of the invention are achieved by providing a filter testing device for testing a filter or filter system, the device comprising switching means, external connections, and internal volumes which can come in contact with a fluid from a filter or filter system to be tested, in which the switching means and the external connections are in fluid communication via the internal volumes, and in which the fluid testing device includes means for cleaning at least one of the internal volumes, and the cleaning means includes means for selecting the at least one internal volume to be cleaned from among the internal volumes.

Preferred embodiments of the invention are described in further detail hereinafter.

According to this invention, a cleaning method for a filter testing device is provided, whereby the filter testing device includes switching means, external connections and internal volumes which may come in contact with a fluid from a filter device that is to be tested, such that the cleaning method comprises the following steps:

selecting one or more internal volumes to be cleaned;

cleaning the selected internal volumes with a cleaning fluid by appropriate switching of the switching means; and draining out and/or removing the cleaning fluid contained in the cleaned internal volume from said internal volume.

In the inventive method, the internal volumes to be cleaned can be selected, and in particular all or essentially all the internal volumes which come in contact with a fluid that is to be filtered can be cleaned. It is therefore possible to clean internal volumes which have been contaminated or soiled by a fluid from a filter device that is to be tested.

In one preferred embodiment, the cleaning and/or draining is/are performed essentially in succession. By successive cleaning of the internal volumes that are to be cleaned, it is possible to ensure a comprehensive cleaning of the internal volumes that are to be cleaned. Furthermore, by successive draining of the cleaning fluid out of the internal volumes it is possible to ensure reliably that no more cleaning fluid is subsequently present in the respective internal volume.

Furthermore, in the inventive cleaning method, the draining step includes a step of drying, preferably essentially successively, the cleaned internal volumes by appropriate switching of the switching means. The drying step is preferably performed by means of compressed air of preferably at least 1 bar. Drying the cleaned internal volume, preferably with compressed air, ensures that essentially no more cleaning fluid remains in the cleaned internal volumes.

The cleaning step preferably includes a step of filling the internal volumes that are to be cleaned with the cleaning fluid and then subsequently rinsing the volumes with the fluid.

In one preferred embodiment, the rinsing step includes essentially continuous and preferably successive rinsing with a cleaning fluid that is always being replenished over a predetermined and/or predeterminable period of time. By rinsing with cleaning fluid that is always being replenished, it is possible to reliably rinse all bacteria and contamination out of the internal volumes that are to be cleaned so that a reliable cleaning can be ensured.

The rinsing step preferably takes place only after a certain period of time, preferably about 30 minutes, has elapsed after the filling step. Thus, the cleaning fluid that has been supplied can act in the internal volumes that are to be cleaned so that the contaminants are "loosened" and are released from the surface of the internal volumes that are to be cleaned, so that the "loosened" dirt is removed by the subsequent rinsing.

In another preferred embodiment, the switching means include pneumatic switching means and preferably also valves and/or proportional valves. The valves to be used preferably have a small valve volume. Furthermore, the valves that are to be used may be diaphragm valves.

Furthermore, according to this invention, a computer program product is also made available which includes program parts for implementing the method according to this invention or a preferred embodiment thereof. Furthermore, a computer program which, when loaded onto a computer, is capable of executing the method according to this invention or a preferred embodiment thereof is made available. Furthermore, a computer-readable memory medium on which such a computer program is stored is also made available.

Furthermore, this invention makes available a filter testing device for testing filters and/or filter systems, comprising switching means, external connections and internal volumes which can come in contact with a fluid from a filter device that is to be tested, wherein the switching means are in fluid connection with one another and with the external connections via the internal volumes, wherein the filter testing device is designed so that at least a portion of the internal volumes can be cleaned, whereby the internal volume to be cleaned can be selected from the plurality of internal volumes.

At least one external connection is preferably designed so that a cleaning fluid can thereby be supplied to the filter testing device for cleaning at least the selected internal volume. Thus, a cleaning fluid tank may conveniently and easily be connected to the filter testing device that is to be cleaned.

Furthermore, at least one external connection is designed so that the cleaning fluid supplied can be drained out and/or disposed of through the connection.

In a preferred embodiment, at least one external connection is designed so that a compressed air source can be connected to it for drying the cleaned internal volumes. Drying of the cleaned internal volumes can thus be performed with compressed air at a suitable pressure.

Preferably, at least one external connection is designed so that an external reference tank can be connected to it.

Furthermore, the switching means include pneumatic switching means, preferably valves and/or proportional valves.

The internal volumes preferably include connecting lines between the switching means, connecting lines between the switching means and the external connections, volumes in the switching means, preferably an internal reference tank, and connecting lines between the internal reference tank and at least one switching means.

Due to the fact that it is possible to reliably ensure that essentially no residues of the fluid to be filtered are still present in the filter testing device after cleaning the filter testing device, it is possible to use the inventive filter testing device in a validation process of the filter and/or filter system to be tested.

The internal volumes of parts and/or lines are preferably defined as consisting of parts and/or lines made of high-grade steel and/or polytetrafluoroethylene (Teflon™). This further improves the validation capability of the testing device.

Other functions, features and advantages of the present invention are apparent from the following description.

BRIEF DESCRIPTION OF THE DRAWINGS

The invention will be described in further detail hereinafter with reference to illustrative preferred embodiments shown in the accompanying drawing figures, in which:

FIG. 2 is a table of the valve assignment and/or control of the valves of the inventive filter testing device during and/or for the implementation of the inventive cleaning method.

DETAILED DESCRIPTION OF PREFERRED EMBODIMENTS

Figure 1:
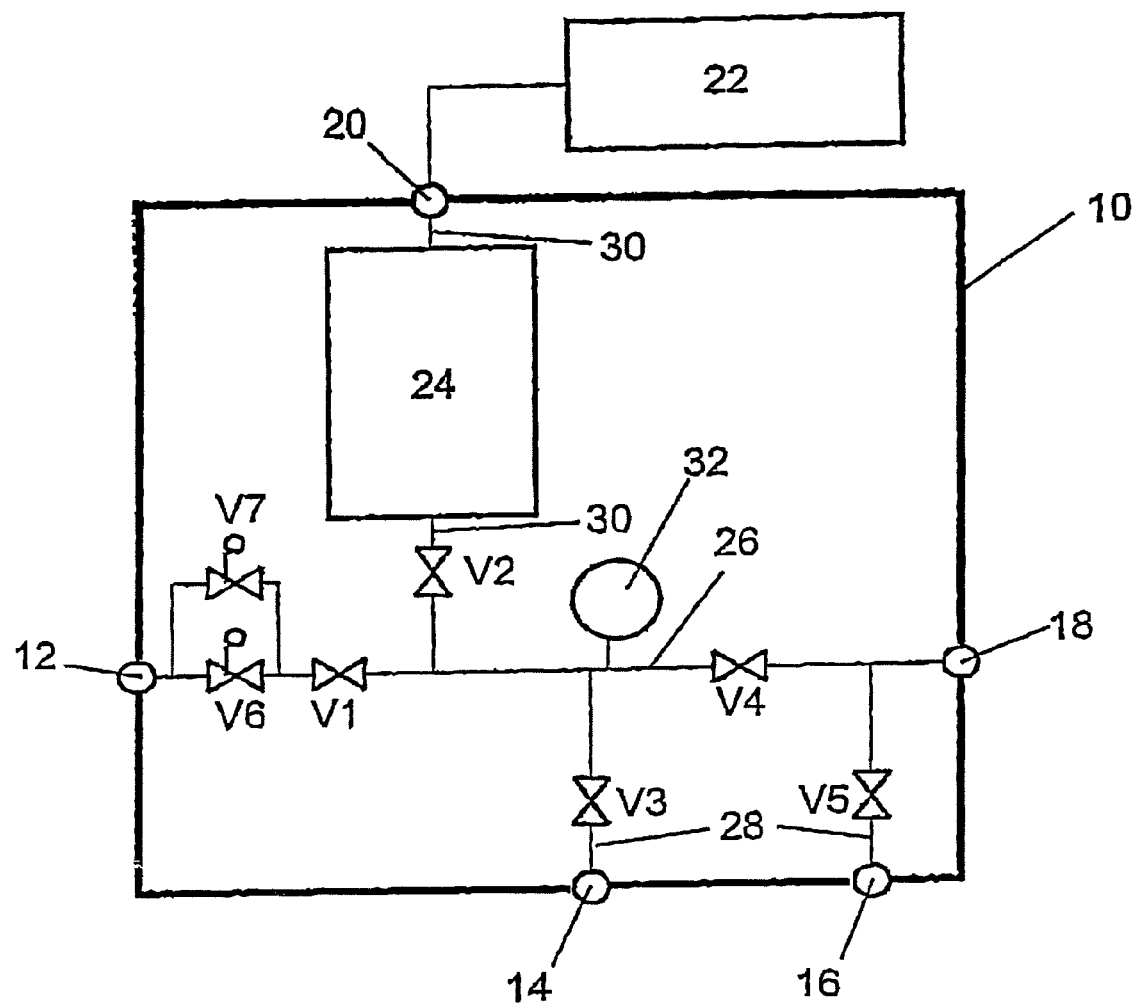
FIG. 1 is a schematic illustration of a filter testing device according to a preferred embodiment of this invention.

FIG. 1 shows a schematic diagram of a filter testing device 10 according to a preferred embodiment of the present invention. The filter testing device 10 includes the switching valves V1 through V5 and a proportional valve V6. Furthermore, the filter testing device 10 includes external connections, where the external connections include a compressed air supply connection 12 through which compressed air is supplied in testing operation, a connection 14 for internal venting, a connection 16 for external venting, a filter connection 18 for connecting the filter and/or the filter device to be tested, and a connection 20 for an external reference tank 22. An internal reference tank 24 is preferably present in the filter testing device 10. The valves V1 through V5 are in mutual fluid connection through the connecting lines 26. Furthermore, the valves are in fluid connection with the respective internal connections via the connecting lines 28. The internal reference tank 24 is in fluid connection with the valve V2 and with the connection 20 for the external reference tank 22 via the connecting lines 30.

The valves V1–V5 are preferably diaphragm valves and also preferably have a small valve volume $V_{V1}$–$V_{V5}$.

The connecting lines 26, 28, 30, the internal reference tank 24, and the volumes $V_{V1}$–$V_{V5}$ of the valves V1–V5 are referred to below as internal volumes. Furthermore, in the illustrative description of a preferred embodiment of the present invention given below, a filter testing device 10 which comprises only one proportional valve V6 is described.

Furthermore, the filter testing device 10 preferably includes a pressure meter 32.

During the testing of a diaphragm filter, for example, the internal reference tank 24 is filled with compressed air of a certain pressure. During a following measurement, the size of the pressure drop in the filter is determined with the help of the reference tank 24 and the pressure meter 32, and thus the quality of the filtered is determined.

As part of this testing, the filter and/or the filter device to be tested is/are preferably also validated, i.e., the quality of the filter is determined on the basis of predetermined and/or predeterminable standards. Therefore, the testing device 10 is preferably connected to the contaminated side of the filter, i.e., the side to which the fluid that is to be filtered is supplied. During the test, however, it frequently happens that unfiltered fluid, which is thus contaminated, enters the filter testing device 10, in particular its internal volumes, through a return flow. However, for testing that is suitable for validation, it is necessary to ensure that the filter testing device 10 is not contaminated with bacteria or soiling before each new testing procedure. It is thus necessary to thoroughly clean the filter testing device 10, preferably before each testing operation. Furthermore, to permit even more reliable cleaning, the internal volumes are preferably defined as consisting of parts and/or lines which are made essentially completely of a high-grade steel or a material that conforms to FDA requirements (FDA=U.S. Food and Drug Administration), for example, polytetrafluoroethylene (Teflon™).

The inventive cleaning method is described below with reference to the valve table shown in FIG. 2.

The switching of the valves can be performed manually or automatically. In an interactive procedure, an operating person is preferably instructed to perform various actions, e.g., connecting tubes to certain external connections, and then this is confirmed via an input device (not shown). In addition, the switching of the valves is preferably performed automatically according to a cleaning program that is to be selected.

First, one or more internal volumes to be cleaned are selected from a plurality of internal volumes. This may preferably take place by way of an input (not shown). However, it is also conceivable for the selection to be made by manually switching the valves. In the cleaning process which is described below as an example, essentially all the internal volumes are selected and cleaned.

A function check is then performed, preferably to check on whether there is an adequate operating pressure in a compressed air source (not shown).

If it is found that there is an adequate operating pressure, then first a step of filling is performed, i.e., flooding the selected internal volumes that are to be cleaned, namely all the internal volumes in the present case. To do so in the present case three paths are filled in succession with one cleaning fluid, which may be a suitable cleaning fluid as described below.

Initially, a cleaning fluid tank is connected via a pump (not shown) to the connection 14 for internal venting.

The internal reference tank first is filled, i.e., flooded. To do so the valves V1 through V6 are brought to the state Z1 shown in the valve table of FIG. 2, i.e., V1, V4, V5 and V6 are closed and V2 and V3 are opened.

Furthermore, a tube which is connected to or leads to a collecting, tank (not shown) is connected to the connection 20 for the external reference tank. Then sufficient cleaning fluid is pumped into the filter testing device 10 until the fluid escapes again at the connection 20 for the external reference tank. As soon as this is detected, the pump is stopped.

Next, the path of the external venting, i.e., the path which includes the valve V5 and the connection 16 for the external venting, is filled, i.e., flooded. The procedure here corresponds to that in filling, i.e., flooding, of the internal reference tank 24, but in this case a corresponding drain hose is connected to the connection 16 for the external venting and the valves are switched according to the state Z2 in the table of FIG. 2. Then, in turn, enough cleaning fluid is added until it is found that cleaning fluid is escaping at the connection 16 for the external venting. Then the pump is stopped again.

Next the filter connection 18 is filled, i.e., flooded. To do so, the procedure followed corresponds to that for the two cases described above, i.e., a hose is connected to the filter connection 18 and the valves are switched according to the state Z3 in the table of FIG. 2. The cleaning fluid is pumped into the filter testing device 10 until it is detected that the cleaning fluid introduced is escaping at the filter connection 18. Then the pump is stopped.

When all the volumes that are to be cleaned have been filled, i.e., flooded, all the valves V1 through V6 are closed (state Z4). This state is retained for a predetermined and/or predeterminable period of time t1 to "loosen" the dirt present in the volumes that are to be cleaned, i.e., to partially dissolve the dirt present in and/or adhering to the internal volumes and to treat the dirt by a chemical and/or biological reaction. The period of time t1 is preferably about 30 minutes, but the period of time t1 may also be set differently, e.g., in accordance with the type of contamination present and the type of cleaning fluid used. After the period of time t1 has elapsed, the volumes to be cleaned are rinsed with a cleaning fluid which is always being replenished. The rinsing of the volumes that are to be cleaned preferably takes place at the same time, i.e., all the internal volumes are rinsed at the same time. Therefore, the valves are switched according to the state Z5 in the table in FIG. 2. The rinsing with cleaning fluid that is always being replenished is performed for a predetermined and/or predeterminable period of time t2, which amounts to about 10 minutes in a preferred embodiment, i.e., is preferably shorter than t1.

The drying of the rinsed internal volumes is described below. The drying is preferably performed with a stream of air at a certain pressure. The pressure preferably amounts to a relative pressure of about 1 bar, but a stream of air at any other suitable pressure may also be used. Thus, a check is first performed to determine whether there is a sufficient air pressure in the compressed air source (not shown).

If there is a sufficient air pressure, the step of drying the cleaned, preferably rinsed or filled, internal volumes is performed. The rinsed internal volumes are preferably dried in succession as described below.

For drying the internal reference tank 24, first a compressed air supply is connected to the connection 20 for the external reference tank 22. The valves are then switched according to the state Z6 in the table of FIG. 2. Then compressed air, preferably at approximately 1 bar, is introduced into the filter testing device 10 through the connection 20 for the external reference tank 22. This state is maintained for a predetermined and/or predeterminable period of time t3.

After the period of time t3 has elapsed, the internal reference tank 24 is closed, i.e., the valves are brought to the state Z7 and thus the valve V2 is closed. With this step, cleaning of the internal reference tank 24 is concluded.

For drying the internal venting comprising the valve V3 and the connection 14 for the internal venting, first the compressed air supply is connected to the compressed air connection 12. In a state Z8, a sufficient pressure is built up in and/or for the proportional valve V6 by switching the proportional valve V6 to X%, i.e., the pressure drop in the proportional valve V6 amounts to between 100% and 0%. The valves are then switched one after the other according to the states Z9 through Z13, i.e., while the internal venting is drying, air flows out of the filter testing device 10 alternately through the connection 14 for the internal venting and through the connection 16 for the external venting.

After a predetermined and/or predeterminable period of time t4 has elapsed, the drying of the internal venting is concluded, and the valves are switched to the state Z14 and subsequently Z15, i.e., the internal venting is vented and the valve V3 of the internal venting is closed. Thus the drying of the internal venting is concluded.

Then the external venting, which comprises the valve V5 and the connection 16 for the external venting, is dried and then the filter connection 18 is dried.

To do so, the pressure connection of the compressed air supply remains connected to the compressed air connection 12, the valves are switched to the state Z16 and compressed air of a predetermined and/or predeterminable pressure is passed through the filter testing device 10, so that the air escapes at the connection 16 for the external venting and at the filter connection 18. After a predetermined and/or predeterminable period of time t5 has elapsed, the drying of the external venting is concluded and the valves are switched to the state Z17 to then dry the filter connection 18. In doing so, the path of the external venting is closed by closing the valve V5. Then compressed air is again passed through the filter testing device 10, with the air then escaping only at the filter connection 18. After a predetermined and/or predeterminable period of time t6 has elapsed, the drying of the filter connection 18 is concluded and the valves V1–V6 are switched to the state Z18.

The cleaning process is thus concluded and the filter testing device 10 is now ready for use for the next testing operation.

To reliably ensure the validation capability of the inventive filter testing device 10, a so-called safety function is also provided in the filter testing device 10 in a preferred embodiment of this invention. In this embodiment, in the event of a premature termination of the drying process, a warning is output to the operating person, indicating that the cleaned filter testing device 10 does not have validation capability. Such a warning is output with each test procedure until a proper drying has been conducted.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter testing device for testing a filter or filter system, said device comprising switching means for enabling and stopping a fluid connection of internal connection lines, external connections, internal volumes which can come in contact with a fluid from a filter or filter system to be tested, and a device housing containing said switching means and internal connection lines, wherein:

the switching means and the external connections are in fluid communication via the internal volumes, the switching means have at least an open state in which respective internal volumes can be brought into communication with each other and a closed state in which respective internal volumes can be brought out of communication with each other, said switching means comprising switching valves, the external connections include a filter connection for connecting the filter or filter system to be tested externally to the device housing, a compressed air supply connection through which compressed air is supplied in testing operation, a connection for internal venting, a connection for external venting, and a connection for an external reference tank, the filter testing device includes means for cleaning at least one of said internal volumes, said cleaning means including means for selecting the at least one internal volume to be cleaned from among said internal volumes during cleaning, the filter testing device includes an internal reference tank to be filled with compressed air during testing, and a pressure meter which detects the pressure drop of the filter to be tested, said internal reference tank connected by connecting lines between the internal reference tank and the switching means, and said pressure meter being isolable from other internal volumes for cleaning, and the internal volumes are the connecting lines between the switching valves, connecting lines between the switching valves and the external connections, connecting lines between the internal reference tank and a switching valve, the internal reference tank, and the volumes of the switching valves.

2. A device according to claim 1, wherein at least one of said external connections is connected to a supply of cleaning fluid so that the cleaning fluid can be supplied through said at least one external connection to the filter testing device for cleaning at least one selected internal volume.

3. A device according to claim 1, wherein at least one of said external connections is connected to means for discharging cleaning fluid from selected internal volumes.

4. A device according to claim 1, wherein at least one of said external connections is connected to a source of compressed air for drying cleaned internal volumes.

5. A device according to claim 1, wherein at least one of said external connections is connectable to an external reference tank.

6. A device according to claim 1, wherein the switching means are pneumatic switching means.

7. A device according to claim 6, wherein the pneumatic switching means are pneumatically operable valves.

8. A device according to claim 6, wherein the pneumatic switching means comprise pneumatically operable proportional valves.

* * * * *